Figure 1:
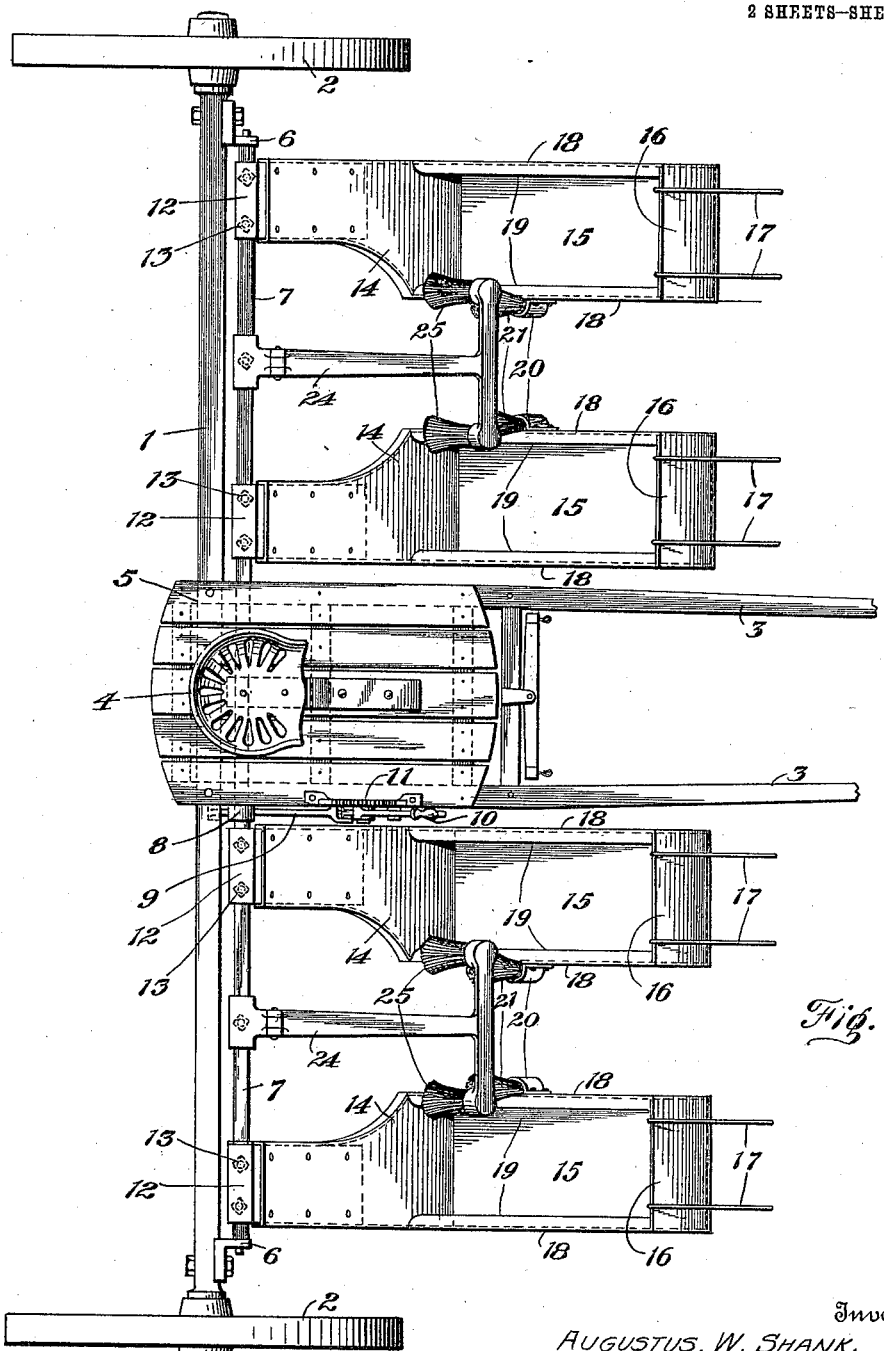

A. W. SHANK.
POTATO BUG COLLECTOR.
APPLICATION FILED SEPT. 17, 1910.

1,001,998.

Patented Aug. 29, 1911.

2 SHEETS—SHEET 1.

Inventor
AUGUSTUS. W. SHANK.

Witnesses

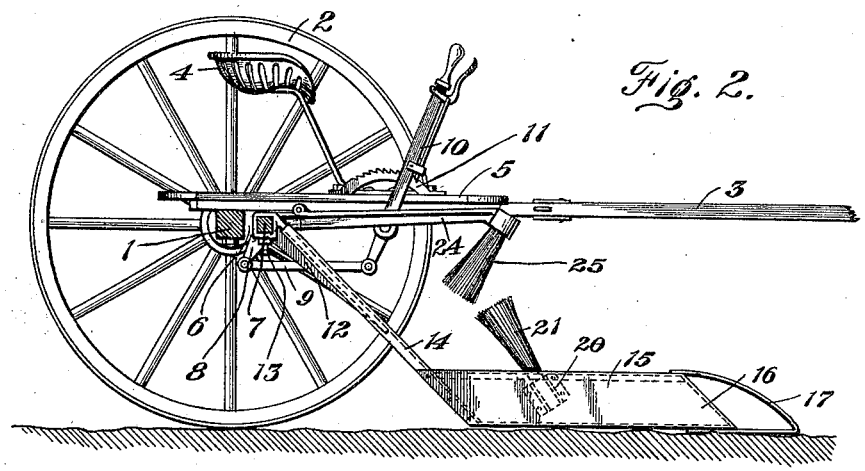
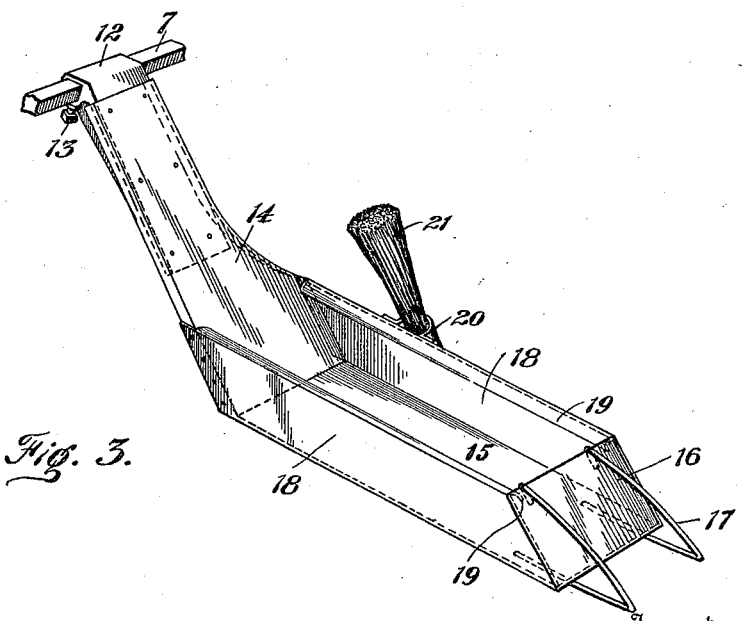

UNITED STATES PATENT OFFICE.

AUGUSTUS W. SHANK, OF DETROIT, MICHIGAN, ASSIGNOR OF ONE-FOURTH TO HANS E. HANSEN, ONE-EIGHTH TO CHRISTIAN RUPP, AND ONE-FOURTH TO WILLIAM W. TACKABURY, ALL OF DETROIT, MICHIGAN.

POTATO-BUG COLLECTOR.

1,001,998.   Specification of Letters Patent.   Patented Aug. 29, 1911.

Application filed September 17, 1910. Serial No. 582,456.

*To all whom it may concern:*

Be it known that I, AUGUSTUS W. SHANK, a citizen of the United States of America, residing at Detroit, in the county of Wayne and State of Michigan, have invented certain new and useful Improvements in a Potato-Bug Collector, of which the following is a specification, reference being had therein to the accompanying drawings.

This invention relates to a potato bug collecting machine and to an arrangement thereof whereby it is adjustable and effective for two or more rows of potatoes.

The invention consists in the matters hereinafter set forth, and more particularly pointed out in the appended claims.

In the drawings, Figure 1 is a plan view of a machine that embodies features of the invention; Fig. 2 is a view in side elevation thereof; and Fig. 3 is a view in detail of a pan therefor.

As herein indicated, the main axle 1 with bearing wheels 2 at the ends thereof, has a pair of centrally disposed thills 3 with driver's seat 4 and platform 5. Brackets 6 near each end of the axle afford sufficient support for a flattened, polygonal or square rock shaft 7 whose ends are journaled in the brackets. A rock arm 8 depending from the rock shaft is coupled by a rigid link 9 to the lower end of a ratchet lever 10 whereby the rock shaft may be readily tilted as desired, the lever having interlocking relation with a suitable quadrant 11. By rocking the shaft the pans may be raised clear of the ground when the machine is being drawn along the road.

A series of forwardly extending hangers 12 that are adjustable longitudinally on the shaft and may be secured in any position desired, as by a clamping screw 13 or the like, each support an extension 14 of an end wall of a collecting pan 15. The latter have their forward end walls 16 disposed obliquely and are each supported on wire guards 17 adapted to run on the surface of the ground and pick up vines thereon so that the latter will sweep across the bodies of the pans themselves. The side walls 18 of the pans are preferably parallel and vertical and have inrolled margins 19. The pans are disposed in pairs and brush holders 20, preferably tubular, are secured in alined relation on the adjacent sides of each pair of pans. The sockets are preferably tilted back so that brushes 21 secured therein slope sufficiently to allow vines passing between the pans to readily slip over them. A beater arm 24 is secured at its inner end adjustably on the rock shaft between each pair of pans. In preferred form the beater is hinged near its inner end so as to fall back and its forward extremity has a cross bar or is T-shaped to hold depending brushes 25. The adjacent margins of the pan extensions carried by the hangers are preferably cut away to afford full clearance for the vines after the pans and brushes have passed by them.

In operation the machine is so adjusted that each pair of pans can be drawn aside a row when a horse secured in the thills is walking between the rows. When drawn along rows, the pan guards underrun and lift the vine tops which are scoured both above and below by the brushes and snap back with sufficient force to shake insects thereon into the pans or trays. The inrolled margins and inclined end walls prevent the escape of the insects and when thus trapped they may be readily disposed of as desired. The machine may be made to cover a number of rows and is simple and effective in operation.

Obviously, changes in the details of construction may be made without departing from the spirit of the invention and I do not care to limit myself to any particular form or arrangement of parts.

I claim as my invention:—

1. A potato bug collector comprising a main axle, bearing wheels journaled thereon, thills extending forwardly from the main shaft, a rock shaft journaled in front of the main axle in parallel relation thereto, a lever secured to the thills for rocking the counter shaft, pairs of forwardly extending hangers non-rotatable and longitudinally adjustable on the rock shaft, pans having rearwardly extending end walls secured to the depending hangers, brushes secured on the adjacent side walls of each pair of pans in upright position, a beater arm extending forward on the rock shaft between each pair of pans and brushes depending from the forward end of each beater arm.

2. A potato bug collector comprising a main axle, bearing wheels supporting the axle, a pair of brackets on the forward side of the axle near each extremity thereof, thills rigidly secured to the axle near the center thereof, a rock shaft journaled in the brackets in substantially parallel relation to the axle, a series of hangers whose rear ends are non-rotatable and longitudinally adjustable on the rock shaft, a rock arm extending from the shaft, a quadrant secured to the thills, a lever pivoted to the thills operatively connected to the rock arm in interlocking relation to the quadrant, a pan for each hanger having an oblique forward end, vertical side walls and oblique rear end whose upper extended portion is secured to a hanger, a pair of brush holders secured on the adjacent side walls of each pair of pans, brushes in the holders extending upwardly from the pans, a beater arm extending forward from the rock shaft between and over each pair of pans, depending brushes on the forward end of each hanger and a wire guard for each pan consisting of a bar secured at its rear end to the forward portion of the pan and bent between its ends into an elongated loop adapted to traverse the ground in advance of the pan and to lift vines above the pan into the range of action of the brushes.

In testimony whereof I affix my signature in presence of two witnesses.

AUGUSTUS W. SHANK.

Witnesses:
C. R. STICKNEY,
A. M. DORR.

---

Copies of this patent may be obtained for five cents each, by addressing the "Commissioner of Patents, Washington, D. C."